United States Patent [19]

Sakai et al.

[11] Patent Number: 5,662,736

[45] Date of Patent: Sep. 2, 1997

[54] HOT MELT INK

[75] Inventors: Jun Sakai; Yoshito Toyoda, both of Nagoya, Japan

[73] Assignee: Brother Kogyo Kabushiki Kaisha, Nagoya, Japan

[21] Appl. No.: 633,034

[22] Filed: Apr. 16, 1996

[30] Foreign Application Priority Data

Apr. 25, 1995 [JP] Japan ..................... 7-100815

[51] Int. Cl.$^6$ ........................ C09D 11/12; C09D 11/08
[52] U.S. Cl. ........................ 106/31.29; 106/31.61; 524/275; 524/487; 347/100
[58] Field of Search ................. 106/31 R, 23 A, 106/22 A, 30 R

[56] References Cited

U.S. PATENT DOCUMENTS

| | | | |
|---|---|---|---|
| 3,653,932 | 4/1972 | Berry et al. | 106/22 A |
| 4,066,810 | 1/1978 | Kosaka et al. | 106/30 R |
| 4,390,369 | 6/1983 | Merritt et al. | 106/31 R |
| 4,659,383 | 4/1987 | Lin et al. | 106/27 R |
| 4,758,276 | 7/1988 | Lin et al. | 106/27 R |
| 4,820,346 | 4/1989 | Nowak | 106/22 A |
| 4,835,208 | 5/1989 | Ball | 524/478 |
| 5,000,786 | 3/1991 | Matsuzaki | 106/27 R |
| 5,053,079 | 10/1991 | Haxell et al. | 106/30 A |
| 5,124,719 | 6/1992 | Matsuzaki | 346/1.1 |
| 5,185,035 | 2/1993 | Brown et al. | 106/31 R |
| 5,259,873 | 11/1993 | Fujioka | 106/23 A |
| 5,397,388 | 3/1995 | Fujioka | 106/30 A |

FOREIGN PATENT DOCUMENTS 62-295973  12/1987  Japan.

*Primary Examiner*—Helene Klemanski
*Attorney, Agent, or Firm*—Oliff & Berridge

[57] ABSTRACT

A hot melt ink includes at least one wax, at least one coloring material, a first resin having a softening point ranging from room temperatures to 100° C., and a second resin having a softening point ranging from 50° C. to 150° C. and higher than the softening point of the first resin. The hot melt ink has an appropriate softening point and high light transmittance while maintaining fixing property and appropriate viscosity by combining a resin with a relatively low molecular weight and a resin with a relatively high molecular weight.

22 Claims, No Drawings

HOT MELT INK

BACKGROUND OF THE INVENTION

1. Field of the invention

The present invention concerns a hot melt ink used for an ink jet recording device. More in particular, it relates to a hot melt ink used after being thermally melted at a temperature higher than room temperatures in conducting printing.

2. Related Art

Heretofore, various types of systems have been proposed for the ink jet recording system, for example, a so-called electric field control system of jetting ink by utilizing an electrostatic attraction force; a so-called drop-on-demand system (pressure pulse system) of jetting ink by utilizing vibrational pressure of a piezoelement; and a so-called thermal ink jet system of jetting ink by utilizing pressure caused by forming and growing bubbles by high temperature heat, by which screens of extremely high accuracy can be obtained.

In the ink jet recording systems described above, an aqueous ink using water as a main solvent and an oil ink using an organic solvent as a main solvent are generally used. While printed images using the aqueous ink are generally poor in water proofness, the oil ink can provide printed images of excellent water proofness.

However, since the aqueous and the oil inks are liquid at room temperatures, they have drawbacks of tending to cause blurring, not being capable of obtaining sufficient printing density when printed on recording paper, and tending to form deposits from the ink since they are liquid, thereby greatly deteriorating the reliability of the ink jet recording system.

With an aim of improving the drawbacks of the existent solution type inks, so-called hot melt ink jet recording oil inks using ink which is solid at room temperatures have been proposed. Specifically, there have been proposed, for example, an ink containing dialkyl sebacate ester in U.S. Pat. No. 3,653,932, an ink containing natural wax in U.S. Pat. No. 4,390,369 and U.S. Pat. No. 4,390,369, an ink containing stearic acid in U.S. Pat. No. 4,758,276, an ink containing an acid or alcohol of 20 to 24 carbon atoms and further containing ketone having a relatively high melting point in U.S. Pat. No. 4,659,383, an ink containing a thermosetting resin having high hydroxy value, a solid organic solvent having a melting point higher than 150° C. and a small amount of a dye substance in U.S. Pat. No. 4,820,346, an ink comprising a coloring material, a first solvent which is solid at room temperatures and liquefied when heated to a temperature higher than room temperatures, and a second solvent which dissolves the first solvent, is liquid at room temperatures and has high volatility in U.S. Pat. Nos. 5,000,786 and 5,124,719, and an ink containing synthetic wax having a polar group and dye soluble to the wax in Unexamined Japanese Patent Publication No. 62-295973.

Further, there has been proposed a thermoplastic melting composition containing a crystalline hydrocarbon resin as a soluble carrier in U.S. Pat. No. 4,835,208 and a hot melt jet ink containing a hydrocarbon polymer as a thermoplastic vehicle in U.S. Pat. No. 5,185,035.

However, in the hot melt inks described above, sufficient consideration has not been given to the balance between the fixing property of the ink on a recording medium and the optical transmittance of the ink. The fixing property and the optical transmittance are characterized by the resin components in the ink, which vary depending on the kind of resins contained.

SUMMARY OF THE INVENTION

The present inventors have discovered that a resin of a relatively low molecular weight improves the ink fixing property, and an ink that contains only a resin of this type has good ink fixing property but low optical transmittance. Further, the ink softening point is lowered to result in a problem of poor ink preservation at a high temperature. On the other hand, a resin of a relatively high molecular weight improves the optical transmittance, and an ink that contains only a resin of this type has high optical transmittance and a higher softening point, but the fixing property is poor and the ink viscosity is increased, properties which are not preferred for forming ink droplets. Further, a resin of an intermediate molecular weight can satisfy none of the various properties described above.

As described above, none of the existent inks can satisfy both the ink fixing property and the optical transmittance and they have a limit for the print quality.

The present invention has been accomplished to overcome the foregoing problems. It is an object of the present invention to provide a hot melt ink having an appropriate ink softening point and high optical transmittance while maintaining the fixing property and an appropriate viscosity.

The hot melt ink according to the present invention for attaining these and other objects comprises wax, a coloring material, a first resin having a softening point from room temperatures to 100° C. and a second resin having a softening point from 50° C. to 150° C. and higher than that of the first resin softening point. The hot melt ink is preferably for use in a hot melt ink jet recording device in which recording is conducted by thermally melting ink at a temperature higher than room temperatures.

DETAILED DESCRIPTION OF PREFERRED EMBODIMENTS

In the hot melt ink of the present invention, the wax constitutes a main material of the ink and determines ink properties such as thermal characteristic and viscosity. The coloring material provides the ink composition with a color. Further, the resin functions to provide adhesion to print paper, control the viscosity of the ink, hinder the crystallization of the wax and provide the ink with transparency. The first resin predominantly provides the properties of liquid viscosity, depositability and stickiness upon deposition to paper to a hot melt ink, thereby improving the ink fixing property, as well as lowering the softening point of the ink. On the other hand, the second resin lowers the degree of haze of the ink to improve the optical transmittance, as well as improves the hardness of the ink upon paper deposition and increases the softening point. Accordingly, the hot melt ink has excellent fixing property and optical transmittance characteristics and has an appropriate softening point.

The hot melt ink preferably contains, for example, 20 to 80% by weight of the wax, 0.1 to 5% by weight of the coloring material and 10 to 60% by weight of the first and the second resins in total. The hot melt ink shows an acceptable softening point, melt viscosity and hardness for a hot melt type ink jet print recording without deteriorating the characteristics of each of the additive ingredients. The hot melt ink also has high level color-forming property, light transmittance and fixing property to paper.

In the hot melt ink, the first and the second resins preferably have a number average molecular weight of 500 to 500,000 respectively. Therefore, the hot melt ink is not liquid nor excessively hard, nor does the ink have an excessively high softening point at room temperatures. That is, ease in handling of the ink is facilitated.

More preferably, the first and the second resins have a number average molecular weight of from 500 to 20,000 respectively. Therefore, the hot melt ink has both excellent fixing property and excellent light transmittance and shows a relatively low softening point, low viscosity and high depositability of ink droplets to paper. When it is used for an ink jet recording device, the ink saves time typically required for warming up and saves ink jetting energy.

Analogous resins are preferably incorporated as the first and the second resins. Since they are analogous resins, there is no worry of unintentional denaturation to the ink upon mixing each of the ingredients. Also, since there is no extreme difference of the basic properties between the two resins, the characteristics required for the ink can be set easily to achieve satisfactory productivity.

As an example, a solvent soluble resin may be used for the first and the second resins. Therefore, there is no worry that the resin ingredients may become settled in the ink or that macro particles may be deposited.

Hydrogenated petroleum resin or vinylic resin is preferably used as the solvent soluble resin. Since these provide the ink with particularly excellent transparency and give less viscosity increase in the ink relative to the amount added, the ink viscosity can be kept appropriately low even when these resins are added in a relatively great amount. Accordingly, the inks can be formulated easily.

As the wax, wax solid at room temperatures and having a melting point of 50° to 150° C. is preferably used. Hot melt ink having such a wax is solid at room temperatures and is dissolved sufficiently in a working temperature circumstance of an ink jet recording device.

The coloring material is preferably a pigment. In a hot melt ink with pigments, the settling property of the pigment is lowered and the coloring matter ingredients can be kept longer in a dispersed state, and thus printing with good color-forming property can be conducted.

Since the resin with a relatively low molecular weight and the resin with a relatively high molecular weight are combined in the hot melt ink according to the present invention, it is possible to provide a hot melt ink having an appropriate softening point and high light transmittance while maintaining the ink fixing property and an appropriate viscosity.

Further description of preferred embodiments is given below.

The hot melt ink for practicing the present invention preferably comprises 20 to 80% by weight of wax, 1 to 5% by weight of a coloring material and 10 to 60% by weight of a relatively low molecular weight resin and a relatively high molecular weight resin in total. Each of the first and second resins may be present, for example, in an amount ranging from about 1 to about 99% by weight of the total weight of the two resins.

As the wax used for the ink, a wax preferably having a melting point, of 50° to 150° C. and thermally stable is used. Any one of known waxes can be used with no particular restriction, for example, petroleum wax such as, preferably, paraffin wax or micro crystalline wax, plant wax such as, preferably, candelilla wax, carnauba wax, rice wax or jojoba solid wax, animal wax such as, preferably, beeswax, lanolin or whale wax, mineral wax such as, preferably, montan wax, synthetic hydrocarbon such as, preferably, Fisher-Tropsch wax or polyethylene wax, hydrogenated wax such as, preferably, hardened castor oil or hardened castor oil derivative, modified wax such as, preferably, montan wax derivative, paraffin wax derivative, micro crystalline wax derivative or polyethylene wax derivative, higher fatty acid such as, preferably, behenic acid, stearic acid, palmitic acid, myristic acid or lauric acid, higher alcohol such as, preferably, stearyl alcohol or behenyl alcohol, hydroxystearic acid such as, preferably, 12-hydroxystearic acid or 12-hydroxystearic acid derivative, ketone such as, preferably, stearone or laurone, fatty acid amide such as, preferably, lauric acid amide, stearic acid amide, oleic acid amide, erucic acid amide, ricinoleic acid amide, 12-hydroxystearic acid amide, special fatty acid amide or N-substituted fatty acid amide, amine such as, preferably, dodecyl amine, tetradecyl amine or octadecyl amine, ester such as, preferably, methyl stearate, octadecyl stearate, glycerin fatty acid ester, sorbitan fatty acid ester, propylene glycol fatty acid ester, ethylene glycol fatty acid ester or polyoxyethylene fatty acid ester, or α-olefin maleic acid anhydride copolymer.

The waxes described above may be used alone or in admixture of two or more of them. Further, considering the thermal characteristic of the resultant ink, it is preferred that the wax is contained in the ink within a range from 20 to 80% by weight of the ink. That is, if the content of the wax is less than 20% by weight, the characteristics of other additives may become predominant so that the melting point of the ink may be increased or may not be fixed or stabilized, so that the ink might not melt sharply at a printing operation temperature of the ink jet printing device. However, this can be avoided if other additives are selected properly and used such that the melting points of them may be substantially equal with the melting point of the wax. Further, if the content exceeds 80% by weight, the ink might not obtain sufficient melting viscosity, possibly resulting in less ink depositing on print paper.

For the coloring material, any of dyes and pigments known to be used for oil ink compositions can be used. Any of organic or inorganic pigments employed usually in the technical field of printing can be used. Specifically, known pigments can be used with no particular restriction, such as carbon black, cadmium red, molybdenum red, chromium yellow, cadmium yellow, titanium yellow, chromium oxide, viridian, titanium cobalt green, ultramarine blue, prussian blue, cobalt blue, azo pigment, phthalocyanine pigment, quinacridone pigment, isoindolinone pigment, dioxazine pigment, threne pigment, perylene pigment, perynone pigment, thioindigo pigment, quinophthalone pigment, and metal complex pigment. The pigments may be used in combination. Pigments are preferably contained in the ink from 0.1 to 5% by weight of the ink.

For the dye used in the present invention, any of dyes known to be used in the oil ink compositions can be used, and oil soluble dye for example, azo dye, disazo dye, metal complex dye, naphthol dye, anthraquinone dye, indigo dye, carbonium dye, quinoneimine dye, cyanine dye, quinoline dye, nitro dye, nitroso dye, benzoquinone dye, naphthoquinone dye, xanthene dye, phtharocyanine dye and metallo phtharocyanine dye are preferred in view of color-forming property and durability, and the dyes may be used in combination. Dyes are preferably contained in the ink from 0.1 to 5% by weight of the ink and, preferably, from 0.5 to 5% by weight in view of the color-forming property of the ink. Most preferably, dyes are contained in the ink from 0.5 to 3% by weight of the ink to ensure that the dye does not deposit from the ink by thermal change during operation of the printer.

For the hot melt ink, a resin ingredient for controlling the physical properties of the ink may be added. The resin functions to provide adhesion to the print paper, control viscosity of the ink, hinder the crystallization of the wax and, further, provide the ink with transparency. Particularly, the latter two characteristics are suitable characteristics for printing the ink to an OHP (over head projector) sheet.

The hot melt ink contains two kinds of resins, among the resins described above, namely, a first resin having a softening point ranging from room temperatures to 100° C. and a second resin having a softening point ranging from 50° C. to 150° C. and higher than that of the first resin. By "room temperatures" is meant temperatures ranging from about 5° C. to about 35° C.

Referring to the molecular weight of the resin used, it is preferred that the number average molecular weight Mn is from 500 to 500,000. This is because most of resins are in a liquid state at room temperatures if the number average molecular weight Mn is below 500, whereas resins may be hard or have an excessively high melting point if the number average molecular weight Mn exceeds 500,000, and neither property is suitable for the hot melt ink. Further, in view of the thermal characteristic of the resultant ink and, particularly, in view of the efficiency of the jetting energy of the printer head used for an ink jet recording, or the time required for the dissolution of the ink, that is, the warming up time, it is most preferably from 500 to 20,000.

As the resins, a solvent soluble resin is preferred, although any resins known to be used in hot melt inks may be suitably used. As the solvent soluble resin, there can be mentioned, for example, olefinic resin such as, preferably, polyethylene resin, polypropylene resin or polyisobutylene resin, vinylic resin such as, preferably, ethylene-vinyl acetate copolymer resin, vinyl chloride-vinyl acetate copolymer resin, vinyl acetate resin or ethylene-vinyl chloride-vinyl acetate resin, acrylic resin such as, preferably, methacrylate ester resin, polyacrylate ester resin, ethylene-ethyl acrylate copolymer resin or ethylene-methacrylic acid copolymer resin, phenolic resin, polyurethane resin, polyamide resin, polyester resin, ketone resin, alkyd resin, rosin resin, hydrogenated rosin resin, petroleum resin, hydrogenated petroleum resin, maleic acid resin, butyral resin, terpene resin, hydrogenated terpene resin, or chroman-indene resin.

The two kinds of resins added to the hot melt ink are preferably analogous resins. By "analogous resins" is meant resins of the same general type, such as each resin being olefinic, vinylic, acrylic, polyester or polyamide resin, for example, including resins having closely similar chemical structures but differing slightly, for example differing by one or two carbon atoms in the length of an alkyl chain forming a part of the resins. That is, it is preferable to use resins selected from the same group or resins having a similar structure for the hot melt ink. If the resins are analogous, there is no worry of causing unintentional denaturation to the ink upon mixing each of the ingredients. Further, since there is no extreme difference of the basic properties between the resins, the characteristics required for the ink can be set easily. That is, resins for required ink characteristics can be easily selected to achieve satisfactory productivity.

Among the resins described above, hydrogenated petroleum resin and vinylic resin provide particularly high transparency to the ink, while exhibiting low viscosity increase in the ink based on the addition amount. Accordingly, the viscosity of the ink is acceptable even when a relatively great amount of the resin is added.

Further explanation is made by way of the following examples that embody the present invention.

EXAMPLE 1

The waxes in Example 1 are paraffin wax (HNP-16, manufactured by NIPPON SEIRO CO., LTD.) and α-olefin maleic acid anhydride copolymer (POWAX H-20, manufactured by NIPPON OIL CO., LTD.), the dye as the coloring material is C.I. SOLVENT RED 49 (Oil Pink 312, manufactured by Orient Chemical Industry Co.), the first resin is hydrogenated petroleum resin (ARKON P-90, manufactured by Arakawa Chemical Co.) and the second resin is hydrogenated petroleum resin (ARKON P-140, manufactured by Arakawa Chemical Co.).

| Ink formulation | |
|---|---|
| HNP-16: | 35 wt % |
| POWAX H-20: | 15 wt % |
| Oil Pink 312: | 2 wt % |
| ARKON P-90: | 30 wt % |
| (softening point = 90° C.) | |
| (number average molecular weight Mn = 570) | |
| ARKON P-140: | 18 wt % |
| (softening point = 140° C.) | |
| (number average molecular weight Mn = 860) | |

The hot melt ink described above may be manufactured by the following procedures.

The paraffin wax, the α-olefin maleic acid anhydride copolymer, the hydrogenated petroleum resin having a low softening point, and the hydrogenated petroleum resin having a relatively high softening point are dissolved by heating at a temperature about from 70° C. to 250° C., preferably, 100° C. to 200° C., and mixed with C.I. SOLVENT RED 49. They are mixed under stirring by a dissolver at 200 to 10,000 rpm, preferably, at 500 to 5,000 rpm. The ink composition thus prepared is filtered using a 2 μm mesh filter in a hot filtration device manufactured by Toyo Filter Paper Co. to obtain a final hot melt ink.

The thus prepared composition is charged to a hot melt type ink jet printer to conduct printing on an OHP sheet. Even when the resultant OHP sheet is flexed, the ink does not peel but is fixed firmly. Further, the light transmittance is high (17% haze) to obtain clear projection.

EXAMPLE 2

In Example 2, the waxes are paraffin wax (paraffin wax standard product 155, manufactured by NIPPON SEIRO CO., LTD.), and α-olefin maleic acid anhydride copolymer (DICARNA 30, manufactured by Mitsubishi Kasei Corp.), the first resin is ethylene-vinyl acetate copolymer (EVAFLEX V577, manufactured by Mitsui DuPont Chemical Co.), the second resin is ethylene-vinyl acetate copolymer (EVAFLEX EV210, manufactured by Mitsui DuPont Chemical Co.), and the dye as the coloring material is C.I. SOLVENT RED 49 (Neptun Red Base 543, manufactured by BASF Co.).

| Ink formulation | |
|---|---|
| Paraffin wax standard product 155: | 78 wt % |
| DICARNA 30: | 10 wt % |
| EVAFLEX V577: | 5 wt % |
| (softening point = 84° C.) | |
| (number average molecular weight Mn = 10,000) | |

| Ink formulation | |
|---|---|
| EVAFLEX EV210: | 5 wt % |
| (softening point = 85° C.) | |
| (number average molecular weight Mn = 14,000) | |
| Neptun Red Base 543: | 2 wt % |

The hot melt ink may be prepared by the following procedures.

The paraffin wax, the α-olefin maleic acid anhydride copolymer, the ethylene-vinyl acetate copolymer having a low softening point, and the ethylene-vinyl acetate copolymer having a relatively high softening point are dissolved by heating at a temperature about from 70° C. to 250° C., preferably, from 100° C. to 200° C., and mixed with C.I. SOLVENT RED 49. They are mixed under stirring by a dissolver at 200 to 10,000 rpm, preferably, 500 to 5,000 rpm. The ink composition thus prepared is filtered using a 2 μm mesh filter in a hot filtration device manufactured by Toyo Filter Paper Co. to obtain a final hot melt ink.

The thus prepared composition is charged to a hot melt type ink jet printer to conduct printing on an OHP sheet. Even when the resultant OHP sheet is flexed, the ink does not peel but is fixed firmly. Further, the light transmittance is high (23% haze), to obtain clear projection.

EXAMPLE 3

In Example 3, the waxes are microcrystalline wax (Hi-Mic 2065, manufactured by NIPPON SEIRO CO., LTD.) and α-olefin maleic acid anhydride copolymer (POWAX M-20, manufactured by NIPPON OIL CO., LTD.), the first resin is hydrogenated petroleum resin (ARKON P-70, manufactured by Arakawa Chemical Co.), the second resin is hydrogenated petroleum resin (ARKON P-115, manufactured by Arakawa Chemical Co.) and the dye as the coloring material is C.I. PIGMENT YELLOW 185 (PALIOTOL YELLOW D1155, manufactured by BASF Co.).

| Ink formulation | |
|---|---|
| Hi-Mic 2065: | 35 wt % |
| POWAX M-20: | 10 wt % |
| ARKON P-70: | 40 wt % |
| (softening point = 70° C.) | |
| (number average molecular weight Mn = 610) | |
| ARKON P-115: | 13 wt % |
| (softening point = 115° C.) | |
| (number average molecular weight Mn = 710) | |
| PALIOTOL YELLOW D1155: | 2 wt % |

The hot melt ink may be prepared by the following procedures.

At first, the α-olefin maleic acid anhydride copolymer and the C.I. PIGMENT YELLOW 185 are mixed under heating at 100° C. Then, the mixture is passed three times under heating at 80° C. through a SYBON roller, which is a temperature control three roll mill manufactured by Inoue Seisakusho, to obtain a dispersion.

Then, the dispersion is melted under heating at 120° C., and the microcrystalline wax, the hydrogenated petroleum resin having a relatively low softening point and the hydrogenated petroleum resin having a relatively high softening point are added, and they are mixed under stirring.

Two to three drops of the thus prepared composition is placed and melted on a slide glass heated to 120° C., and a cover glass is placed thereon and urged slightly. As a result of observation through transmission light using a microscope "XE-UNR" manufactured by NIKON CORP., particles are scarcely recognized and, accordingly, most of the C.I. PIGMENT YELLOW 185 is finely dispersed into a grain size of 1 μm or below and the dispersibility of the pigment is satisfactory.

The ink composition thus prepared is filtered using a 2 μm mesh filter in a hot filtration device manufactured by Toyo Filter Paper Co. to obtain a final hot melt ink.

The thus prepared composition is charged to a hot melt type ink jet printer to conduct printing on an OHP sheet. Even when the resultant OHP sheet is flexed, the ink does not peel but is fixed firmly. Further, the light transmittance is high (25% haze) to obtain clear projection.

EXAMPLE 4

In Example 4, the waxes are paraffin wax (paraffin wax standard product 155, manufactured by NIPPON SEIRO CO., LTD.) and α-olefin maleic acid anhydride copolymer (DICARNA 30, manufactured by Mitsubishi Kasei Corp.), the first resin is aromatic modified terpene resin (RESIN TO-85, manufactured by Yasuhara Chemical Co.), the second resin is aromatic modified terpene resin (RESIN TO-115, manufactured by Yasuhara Chemical Co.) and the dye as the coloring material is C.I. SOLVENT RED 49 (Neptun Red Base 543, manufactured by BASF Co.).

| Ink formulation | |
|---|---|
| Paraffin wax standard product 155: | 53 wt % |
| DICARNA 30: | 10 wt % |
| RESIN TO-85: | 30 wt % |
| (softening point = 85° C.) | |
| (number average molecular weight Mn = 750) | |
| RESIN TO-115: | 15 wt % |
| (softening point = 115° C.) | |
| (number average molecular weight Mn = 790) | |
| Neptun Red Base 543: | 2 wt % |

The hot melt ink may be prepared by the following procedures.

The paraffin wax, the α-olefin maleic acid anhydride copolymer, the aromatic modified terpene resin having a low softening point, and the aromatic modified terpene resin having a relatively high softening point are dissolved by heating at a temperature from about 70° C. to 250° C., preferably, 100° C. to 200° C., and mixed with C.I. SOLVENT RED 49. They are mixed under stirring by a dissolver at 200 to 10,000 rpm, preferably, 500 to 5,000 rpm. The ink composition thus prepared is filtered using a 2 μm mesh filter in a hot filtration device manufactured by Toyo Filter Paper Co. to obtain a final hot melt ink.

The thus prepared composition is charged to a hot melt type ink jet printer to conduct printing on an OHP sheet. Even when the resultant OHP sheet is flexed, the ink does not peel but is fixed firmly. Further, the light transmittance is high (23% haze) to obtain clear projection.

COMPARATIVE EXAMPLE 1

A hot melt ink is obtained in the same manner as in Example 1 except for replacing both the first hydrogenated petroleum resin having a relatively low molecular weight and the second hydrogenated petroleum resin having a relatively high molecular weight having an equal amount of hydrogenated petroleum resin with an intermediate molecular weight.

| Ink Formulation | |
|---|---|
| HNP-16: | 35 wt % |
| POWAX H-20: | 15 wt % |
| Oil Pink 312: | 2 wt % |
| ARKON P-115: | 48 wt % |
| (softening point = 115° C.) | |
| (number average molecular weight Mn = 710) | |

The composition thus prepared is charged to a hot melt type ink jet printer and printing is conducted on an OHP sheet. When the resultant OHP sheet is bent, ink peeling occurs. Further, the light transmittance is lower than that in Example 1 (haze 35%) to obtain unsatisfactory projection.

COMPARATIVE EXAMPLE 2

A hot melt ink is obtained in the same manner as in Example 2 except for adding an equal amount of ethylene-vinyl acetate copolymer having a relatively low molecular weight in place of the ethylene-vinyl acetate copolymer having a relatively high molecular weight.

| Ink Formulation | |
|---|---|
| Paraffin wax standard product 155: | 78 wt % |
| DICARNA 30: | 10 wt % |
| EVAFLEX V577: | 10 wt % |
| Neptun Red Base 543: | 2 wt % |

The composition thus prepared is charged to a hot melt type ink jet printer and printing is conducted on an OHP sheet. As a result, ink peeling does not occur even when the resultant OHP sheet is flexed. However, the light transmittance is lower than that in Example 2 (haze 32%) to obtain unsatisfactory projection.

COMPARATIVE EXAMPLE 3

A hot melt ink is obtained in the same manner as in Example 3 except for adding an equal amount of hydrogenated petroleum resin having a relatively low molecular weight in place of the hydrogenated petroleum resin having a relatively high molecular weight.

| Ink Formulation | |
|---|---|
| Hi-Mic 2065: | 35 wt % |
| POWAX M-20: | 10 wt % |
| ARKON P-115: | 53 wt % |
| (softening point = 115° C.) | |
| (number average molecular weight Mn = 710) | |
| PALIOTOL YELLOW D1155: | 2 wt % |

The composition thus prepared is charged to a hot melt type ink jet printer and printing is conducted on an OHP sheet. The dot shape on the OHP sheet is unstable. Also, the dispersion of the pigment is not uniform, failing to obtain satisfactory projection. Further, when the OHP sheep is flexed, ink peeling occurs. However, the light transmittance is higher than that in Example 3 (haze 20%).

What is claimed is:

1. A hot melt ink comprising:
   at least one wax;
   at least one color ink material;
   a first resin having a softening point ranging from room temperatures to 100° C.; and
   a second resin having a softening point ranging from 50° C. to 150° C. and higher than the softening point of the first resin, wherein the first and second resins are analogous resins.

2. A hot melt ink as claimed in claim 1, wherein the hot melt ink contains 20 to 80% by weight of the at least one wax, 0.1 to 5% by weight of the at least one coloring material and 10 to 60% by weight of the first and second resins in total.

3. A hot melt ink as claimed in claim 1, wherein each of the first and the second resins has a number average molecular weight ranging from 500 to 500,000.

4. A hot melt ink as claimed in claim 3, wherein each of the first and the second resins has a number average molecular weight ranging from 500 to 20,000.

5. A hot melt ink as claimed in claim 1, wherein the first and the second resins are solvent soluble resins.

6. A hot melt ink as claimed in claim 5, wherein the solvent soluble resins are selected from the group consisting of olefinic resin, vinylic resin, acrylic resin, phenolic resin, polyurethane resin, polyamide resin, polyester resin, ketone resin, alkyd resin, rosin resin, petroleum resin, maleic acid resin, butyral resin, terpene resin and chroman-indene resin.

7. A hot melt ink as claimed in claim 5, wherein the solvent soluble resins are hydrogenated resin or vinylic resin.

8. A hot melt ink as claimed in claim 1, wherein the at least one wax is solid at room temperatures and has a melting point ranging from 50° to 150° C.

9. A hot melt ink as claimed in claim 8, wherein the at least one wax is selected from the group consisting. of petroleum wax, plant wax, animal wax, mineral wax, synthetic hydrocarbon, hydrogenated wax, modified wax, higher fatty acid, higher alcohol, hydroxystearic acid, ketone, fatty acid amide, amine, ester and $\alpha$-olefin maleic acid anhydride copolymer.

10. A hot melt ink in as claimed in claim 1, wherein the at least one coloring material is a pigment or dye.

11. A hot melt ink as claimed in claim 11, wherein the at least one coloring material is a pigment.

12. A method of making a hot melt ink, comprising mixing at least one wax, at least one coloring material, a first resin having a softening point ranging from room temperatures to 100° C., and a second resin having a softening point ranging from 50° C. to 150° C. and higher than the softening point of the first resin, wherein the first and second resins are analogous resins.

13. A method of making a hot melt ink as claimed in claim 12, said method further comprising heating at a temperature of from 70° to 250° C. prior to mixing, during mixing, or both prior to and during mixing.

14. A method of making a hot melt ink as claimed in claim 12, said method further comprising filtering a hot melt ink composition formed following mixing.

15. A method of making a hot melt ink as claimed in claim 12, wherein the hot melt ink contains 20 to 80% by weight of the at least one wax, 0.1 to 5% by weight of the at least one coloring material and 10 to 60% by weight of the first and second resins in total.

16. A method of making a hot melt ink as claimed in claim 12, wherein each of the first and the second resins has a number average molecular weight ranging from 500 to 500,000.

17. A method of making a hot melt ink as claimed in claim 12, wherein each of the first and the second resins has a number average molecular weight ranging from 500 to 20,000.

18. A method of recording an image on a recording medium, comprising jetting a hot melt ink onto said recording medium, said hot melt ink comprising at least one wax, at least one coloring material, a first resin having a softening point ranging from room temperatures to 100° C., and a second resin having a softening point ranging from 50° C. to 150° C. and higher than the softening point of the first resin, wherein the first and second resins are analogous resins.

19. A method of recording an image as claimed in claim 18, the method further comprising thermally melting said hot melt ink at a temperature above room temperatures.

20. A method of recording an image as claimed in claim 18, wherein the hot melt ink contains 20 to 80% by weight of the at least one wax, 0.1 to 5% by weight of the at least one coloring material and 10 to 60% by weight of the first and second resins in total.

21. A method of recording an image as claimed in claim 18, wherein each of the first and the second resins has a number average molecular weight ranging from 500 to 500,000.

22. A method of recording an image as claimed in claim 18, wherein each of the first and the second resins has a number average molecular weight ranging from 500 to 20,000.

* * * * *